UNITED STATES PATENT OFFICE.

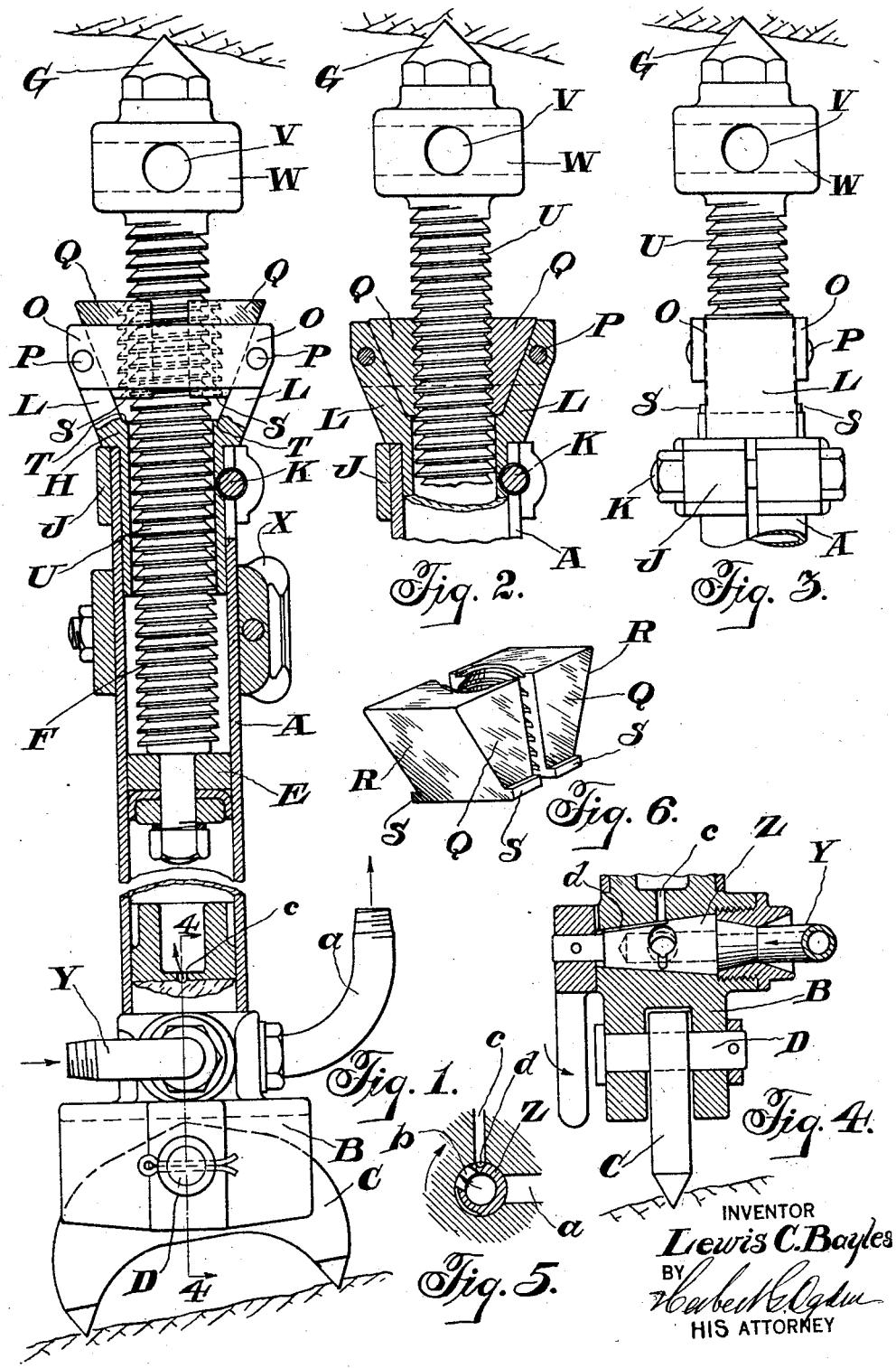

LEWIS C. BAYLES, OF EASTON, PENNSYLVANIA, ASSIGNOR TO INGERSOLL-RAND COMPANY, OF JERSEY CITY, NEW JERSEY, A CORPORATION OF NEW JERSEY.

PNEUMATIC COLUMN.

1,409,905.  Specification of Letters Patent.  Patented Mar. 21, 1922.

Application filed June 22, 1921. Serial No. 479,688.

*To all whom it may concern:*

Be it known that I, LEWIS C. BAYLES, a citizen of the United States, a resident of Easton, county of Northampton, and State of Pennsylvania, have invented a certain Pneumatic Column, of which the following is a specification, accompanied by drawings.

This invention relates to pneumatic columns adapted to support a fluid actuated percussive tool in operative position and the objects of the invention are to enable the fluid actuated piston and piston rod of the column to be longitudinally adjusted and permit additional pressure to be exerted thereby independently of the actuating fluid pressure, and also permit the piston rod to be locked in the desired or final position.

Another object of the invention is to construct the column in such manner that it is safe and will not fall upon failure of fluid pressure.

Further objects of the invention will hereinafter appear and to all of these ends the invention consists of the apparatus shown in the accompanying drawings, in which—

Figure 1 is a side elevation partly in longitudinal section of a column containing the invention, Figure 2 is a side elevation of the upper portion of the column partly broken away and partly in longitudinal section, with some of the parts in a different position.

Figure 3 is a side elevation of the upper portion of the column looking at the column in a plane at right angles to that indicated in Figures 1 and 2.

Figure 4 is a longitudinal sectional detail elevation of Figure 1 on the line 4—4 looking in the direction of the arrows, Figure 5 is a detail transverse sectional view through the throttle valve, and Figure 6 is a detail perspective view of the split nut shown in Figures 1 and 2.

Referring to the drawings, the cylinder casing A is suitably secured to a base B provided with the rock engaging member C pivoted thereto by means of the pin D and adapted to engage at a plurality of points. A piston E movable in the cylinder casing A is provided with a piston rod F extending beyond the end of the cylinder casing and provided with a rack engaging member G at the end of the piston rod.

Means are provided for longitudinally adjusting the piston rod and exerting additional pressure thereon independently of the actuating fluid pressure, including means for locking the piston rod in final adjusted position. A holder H is suitably secured to the outer end of the cylinder casing A as by means of the clamping band J secured by the bolt K and this holder is provided with arms L extending outwardly at an angle. Plates O are secured to the arms at each side as by means of the bolts P, thus bracing the arms and forming guides for the sections Q of a split nut having the inclined sides R bearing on the inclined surfaces of the arms L and also provided with flanges S for limiting the upward movement of the nut sections against the guide plates O. At their lowermost position, the nut sections rest upon the seats T formed by the shoulders at the base of the holder.

The piston rod F is provided with screw threads U adapted to cooperate with the threaded nut sections but as shown, the screw threads U on the piston rod are preferably formed with a backward inclination so that the piston rod may move freely longitudinally through the nut sections Q in an outward direction under fluid pressure, since the nut sections will be pushed outwardly and will slide on the inclined surfaces of the holder arms L. When the rock engaging member, or pointer G has engaged the rock, the piston rod F may be rotated by inserting a bar in the hole V in the head W and as the threads of the piston rod and the nut sections engage, the nut sections will be forced down upon their seats and the piston rod may be tightened with the desired pressure amounting to a number of tons. The nut sections will tightly grip the piston rod as they become wedged within the holder and lock the piston rod in adjusted position so that the column will not fall in case of failure of air pressure. Any suitable clamp X for holding a percussive or other tool may be mounted on the cylinder casing A. Fluid under pressure is supplied to the column through the supply pipe Y controlled by a suitable throttle valve Z and motive fluid may be led from the pipe *a* to the percussive tool. By turning the valve Z in the direction indicated by the arrow in Figure 5 fluid will first be supplied through the valve and the valve port *b* and the port *c* in the base B to the cylinder casing of the column. By continuing to turn the valve in the same direction, motive fluid will be supplied to the pipe *a* for the percussive tool. When the valve Z is turned backward the fluid to the tool is first cut off and by continuing to turn the valve the fluid under pressure in the cylinder casing A will be exhausted through the longitudinal exhaust passage *d* in the periphery of the valve.

I claim:

1. A column adapted to support a fluid actuated percussive tool in operative position, comprising a rock engaging member at one end adapted to engage at a plurality of points, a cylinder casing non-rotatably connected to the said rock engaging member, a fluid actuated piston in the cylinder casing, a piston rod connected to said piston and extending beyond the end of the cylinder casing, a rock engaging member at the end of the piston rod, means for longitudinally adjusting said piston rod and exerting additional pressure thereon independently of the actuating fluid pressure, including a split nut for locking said piston rod in final adjusted position.

2. A column adapted to support a fluid actuated percussive tool in operative position, comprising a rock engaging member at one end adapted to engage at a plurality of points, a cylinder casing non-rotatably connected to the said rock engaging member, a fluid actuated piston in the cylinder casing, a piston rod connected to said piston and extending beyond the end of the cylinder casing, a rock engaging member at the end of the piston rod, and means for forcing said piston rod outwardly independently of the actuating fluid pressure including a split nut for locking the piston rod in final adjusted position.

3. A column adapted to support a fluid actuated percussive tool in operative position, comprising a rock engaging member at one end adapted to engage at a plurality of points, a cylinder casing non-rotatably connected to the said rock engaging member, a fluid actuated piston in the cylinder casing, a piston rod connected to said piston and extending beyond the end of the cylinder casing, a rock engaging member at the end of the piston rod, the said piston rod being externally screw threaded, a holder mounted at the end of the cylinder casing, and a split nut mounted on said holder and adapted to clasp the said piston rod, whereby the piston rod may be moved outwardly freely through the nut by fluid pressure and then may engage the threads of the nut for further adjustment by rotation of the piston rod.

In testimony whereof I have signed this specification.

LEWIS C. BAYLES.